Figure 1:
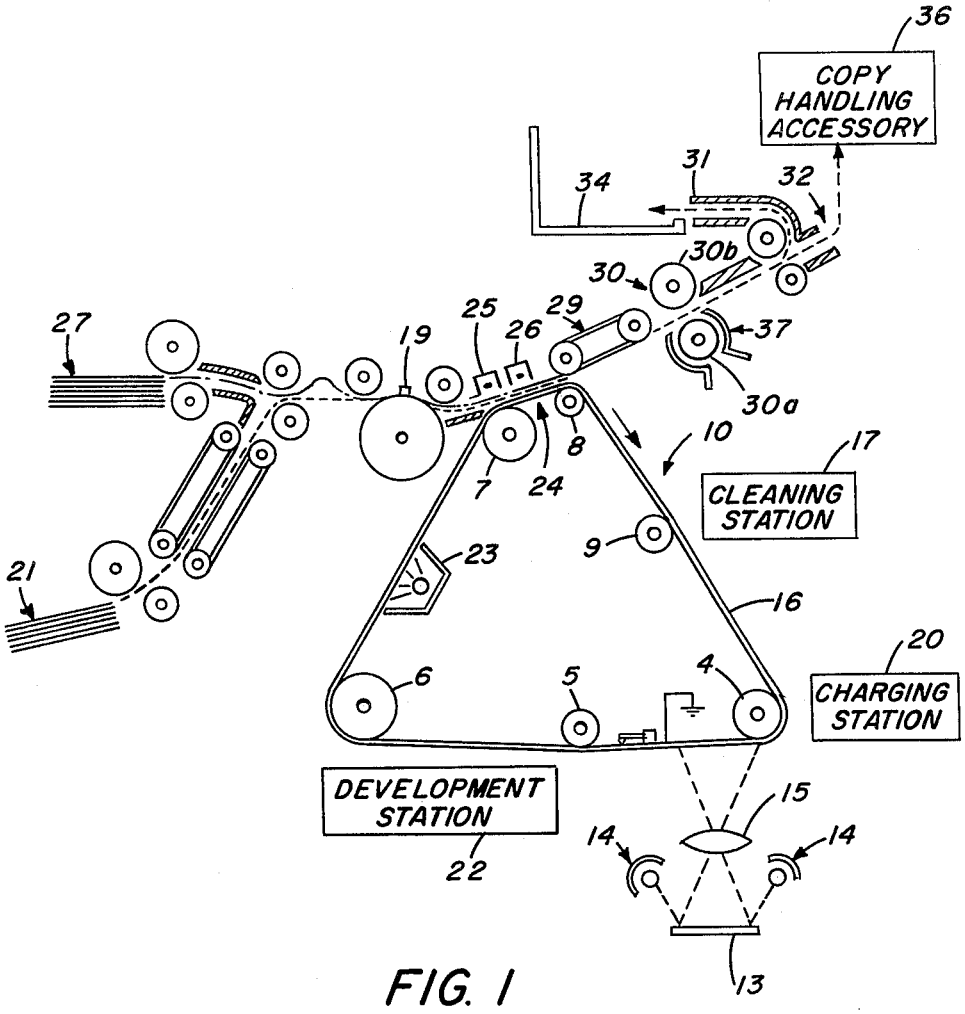
Figure 3:
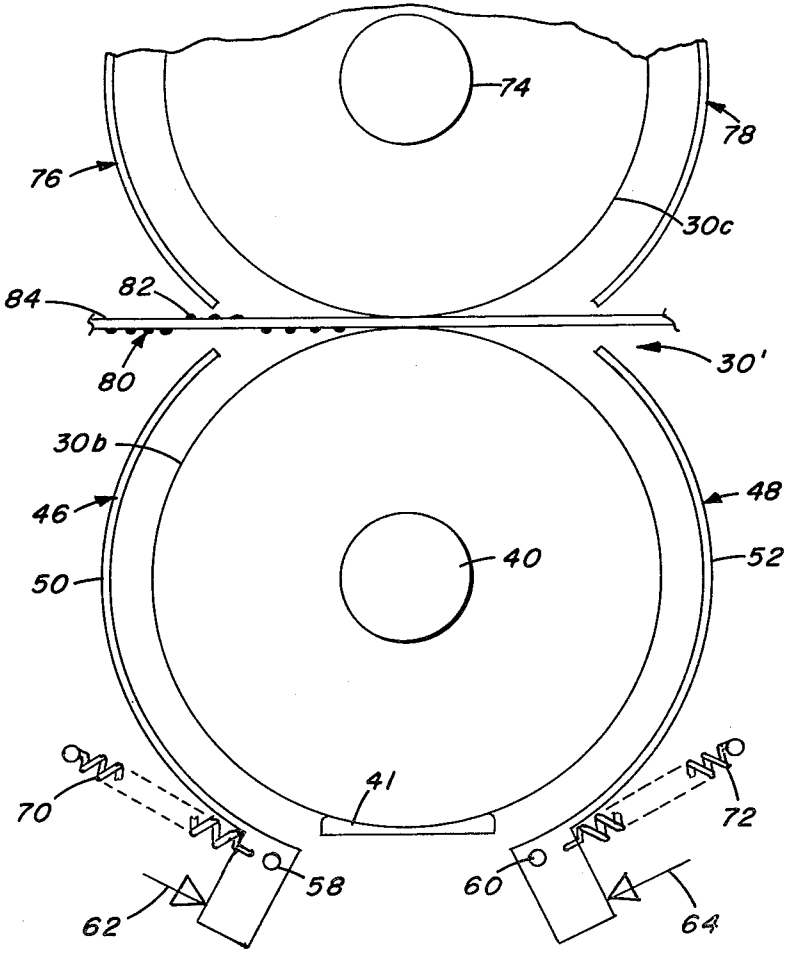
Figure 2:
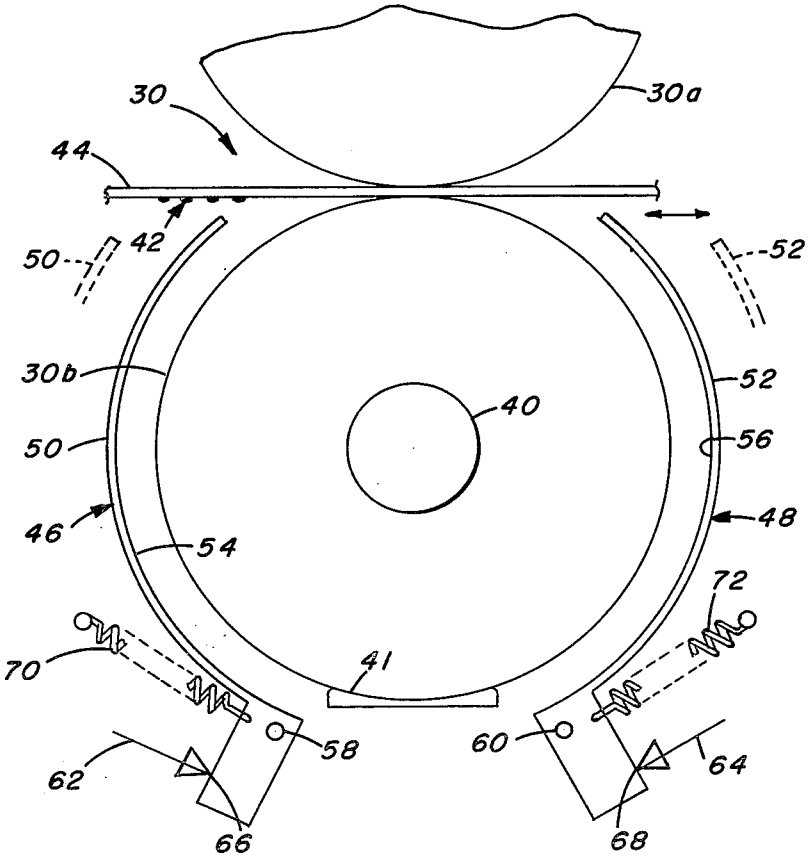

United States Defensive Publication [19] (H) [11] T967,006

Hoffman [43] Feb. 7, 1978

[54] THERMAL CONSERVATION ASSEMBLY FOR ROLLER FUSER

[76] Inventor: Edwin Clarence Hoffman, 901 Elmgrove Road, Rochester, N.Y. 14650

[21] Appl. No.: 818,372

[22] Filed: July 25, 1977

[51] Int. Cl.[2] ..... H05B 1/00; G03G 15/20

[52] U.S. Cl. ..... 219/216; 219/348; 219/349; 219/469

[57] ABSTRACT

In an electrophotographic copier including a fuser having a heated fuser roller, a thermal conservation assembly for minimizing thermal losses and facilitating roller maintenance and removal. The assembly includes first and second heat reflective members which are mounted for pivotal movement between a first position wherein the members are in close proximity with the fuser roller in order to minimize thermal losses and a second position wherein said members are out of proximity with said roller in order to facilitate access to the roller for maintenance and removal. In roller fusers having a pair of heated fuser rollers such as for duplex copy fusing, each roller is provided with a movable thermal conservation assembly.

5 Claims, 2 Sheets Drawing,

9 Pages Specification

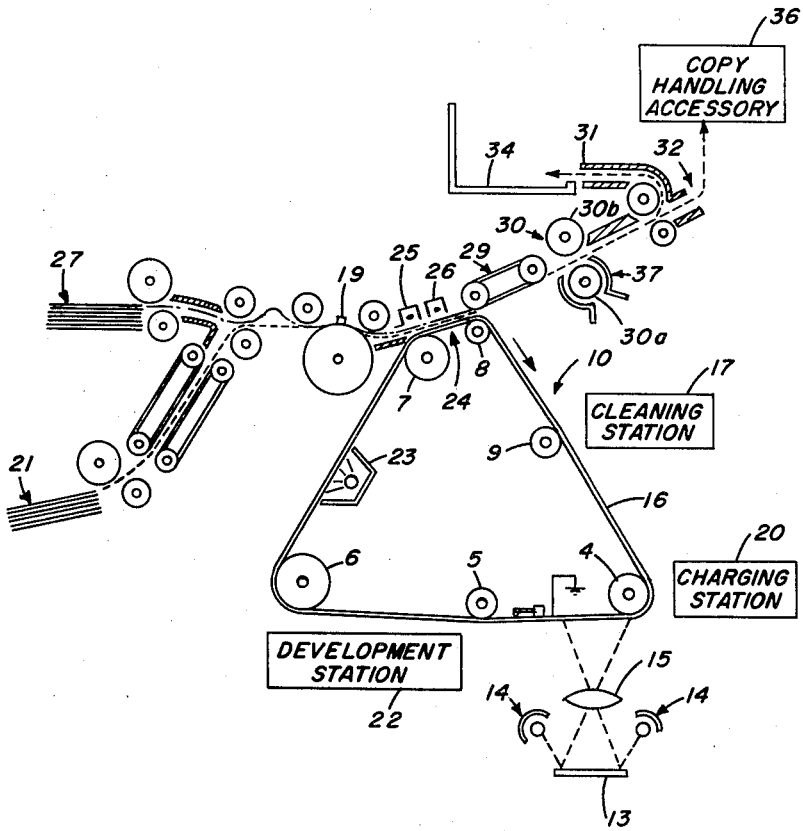

The file of this unexamined application may be inspected and copies thereof may be purchased (849 O.G. 1221, Apr. 9, 1968).